(12) United States Patent
Angelakos

(10) Patent No.: US 10,891,486 B2
(45) Date of Patent: Jan. 12, 2021

(54) AUTHENTICATION USING OBJECT IMAGING

(71) Applicant: Nanotronix Computing Inc., Wilmington, DE (US)

(72) Inventor: Evangelos Angelakos, Athens (GR)

(73) Assignee: Nanotronix Computing Inc., Wilmington, DE (US)

( * ) Notice: Subject to any disclaimer, the term of this patent is extended or adjusted under 35 U.S.C. 154(b) by 97 days.

(21) Appl. No.: 16/461,390

(22) PCT Filed: Nov. 16, 2017

(86) PCT No.: PCT/IB2017/057160
§ 371 (c)(1),
(2) Date: May 16, 2019

(87) PCT Pub. No.: WO2018/092051
PCT Pub. Date: May 24, 2018

(65) Prior Publication Data
US 2020/0057888 A1 Feb. 20, 2020

(30) Foreign Application Priority Data
Nov. 16, 2016 (GB) .................... 1619411.0

(51) Int. Cl.
*G06K 9/00* (2006.01)
*G06F 21/30* (2013.01)
(52) U.S. Cl.
CPC ......... *G06K 9/00677* (2013.01); *G06F 21/30* (2013.01); *G06K 9/00201* (2013.01)

(58) Field of Classification Search
CPC ........... G06K 9/00677; G06K 9/00201; G06K 9/4671; G06K 9/4633; G06K 9/4604; G06K 9/00664; G06F 21/30; H04N 19/60
USPC .......................................................... 382/100
See application file for complete search history.

(56) References Cited

U.S. PATENT DOCUMENTS

| | | | |
|---|---|---|---|
| 2011/0096955 | A1 | 4/2011 | Voloshynovskiy et al. |
| 2016/0210734 | A1 | 7/2016 | Kass et al. |
| 2018/0046187 | A1* | 2/2018 | Martirosyan ........ G05D 1/0094 |
| 2018/0137644 | A1* | 5/2018 | Rad .................... G06K 9/00208 |
| 2020/0193552 | A1* | 6/2020 | Turkelson ............ G06K 9/6228 |

(Continued)

FOREIGN PATENT DOCUMENTS

| | | |
|---|---|---|
| WO | WO 2018/092051 | 5/2018 |
| WO | WO 2018/092051 A3 | 5/2018 |

OTHER PUBLICATIONS

International Preliminary Report on Patentability dated May 31, 2019 From the International Bureau of WIPO Re. Application No. PCT/IB2017/057160. (7 Pages).

(Continued)

*Primary Examiner* — Jerome Grant, II

(57) ABSTRACT

A method of authentication using object imaging, comprising: identifying at least one key geometric marker related to an object captured from a specific viewport and depicted in a reference image; receiving a current image of the object, the current image captured by an imaging device; extracting at least one current geometric marker related to the object from the current image; and comparing the at least one current geometric marker to the at least one key geometric marker to verify that the current image is depicting the object from the viewport.

24 Claims, 8 Drawing Sheets

(56) References Cited

U.S. PATENT DOCUMENTS

2020/0250823 A1* 8/2020 Yamamoto ............ G06T 7/0014
2020/0273090 A1* 8/2020 Ayush ................ G06Q 30/0631
2020/0302241 A1* 9/2020 White ................. G06K 9/6256
2020/0311956 A1* 10/2020 Choi .................. G05B 19/4155

OTHER PUBLICATIONS

International Search Report and the Written Opinion dated Oct. 30, 2018 From the International Searching Authority Re. Application No. PCT/IB2017/057160. (11 Pages).

* cited by examiner

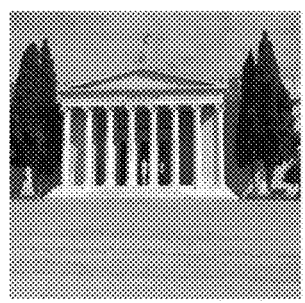 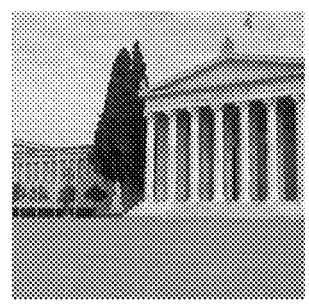 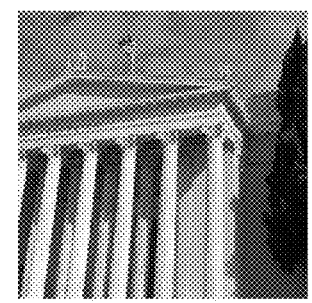
FIG. 3A             FIG. 3B             FIG. 3C
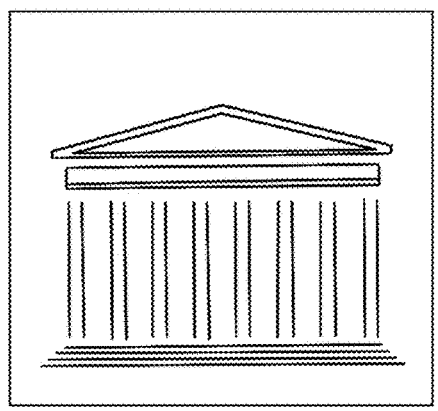 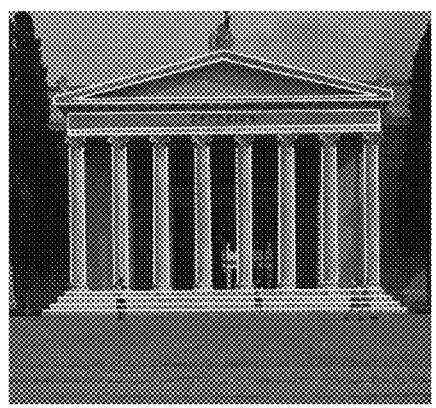
FIG. 4A             FIG. 4B
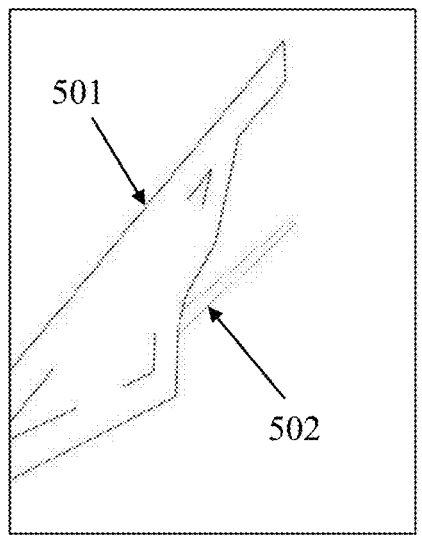 
FIG. 5A             FIG. 5B

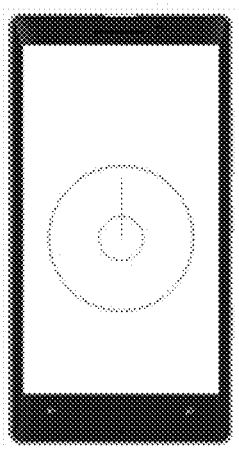
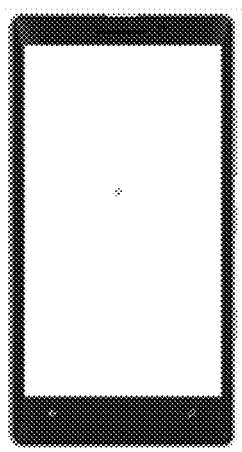
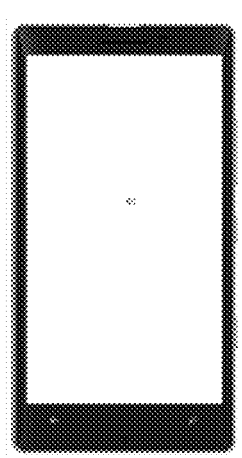
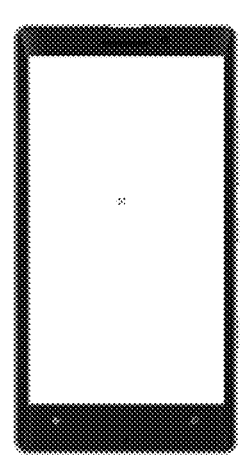
FIG. 8A  FIG. 8B  FIG. 8C  FIG. 8D
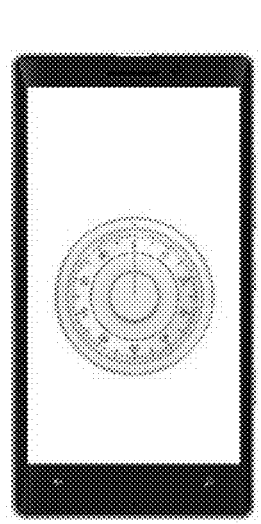
FIG. 8E
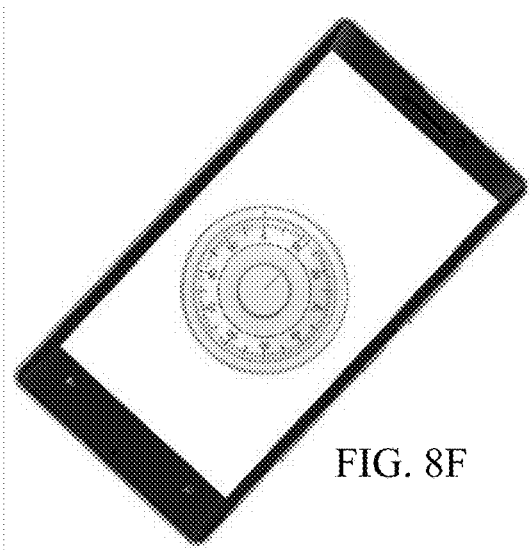
FIG. 8F
FIG. 8G
FIG. 8H

AUTHENTICATION USING OBJECT IMAGING

RELATED APPLICATIONS

This application is a National Phase of PCT Patent Application No. PCT/IB2017/057160 having International filing date of Nov. 16, 2017, which claims the benefit of priority of Great Britain Patent Application No. 1619411.0 filed on Nov. 16, 2016. The contents of the above applications are all incorporated by reference as if fully set forth herein in their entirety.

FIELD AND BACKGROUND OF THE INVENTION

The present invention, in some embodiments thereof, relates to authentication by geometric markers related to images and, more specifically, but not exclusively, to authentication of location and other information by comparing geometric markers to verify object imaging from a specific viewport.

Authentication is used in computer and communication related technologies to verify identity (of a device or a user) and/or other information. In some server-client configurations, the client is required to provide evidence to the server, for example that the client has access to a specific key, or that a user of the client has knowledge of specific information such as a password. The server may then provide a certificate, which may have various uses, for example be used for granting further access to information or functionalities. In other configurations, a program or a device may require a user to provide access to physical media, such as hardware authentication devices (Universal 2nd Factor (U2F) or similar) or biometric data such as facial recognition, fingerprint scanning (and others) for user authentication, granting access to the program or device use, or granting access to specific functionalities within the program or device.

SUMMARY OF THE INVENTION

According to an aspect of some embodiments of the present invention there is provided a method of authentication using object imaging, comprising: identifying at least one key geometric marker related to an object captured from a viewport and depicted in a reference image; receiving a current image of the object, the current image captured by an imaging device; extracting at least one current geometric marker related to the object from the current image; and comparing the at least one current geometric marker to the at least one key geometric marker to verify that the current image is depicting the object from the viewport.

Optionally, the method further comprises: identifying at least one reference geometric marker related to the object in the reference image; presenting the at least one reference geometric marker to a user of the imaging device to indicate the viewport to the user.

Optionally, the method further comprises, first: acquiring the reference image by a reference imaging device; and extracting the at least one key geometric marker from the reference image.

Optionally, the at least one reference geometric marker is overlaid on top of a live video stream acquired by the imaging device.

Optionally, the at least one key geometric marker includes at least one of a point, a line, a polyline, an arc, a shape and a plane.

Optionally, the at least one key geometric marker represent at least one edge of the object, the at least one edge is visually identifiable in the reference image.

Optionally, the reference image is a frame randomly selected from a video sequence.

Optionally, reference image is from a larger image file.

Optionally, the at least one key geometric marker include a plurality of hierarchically prioritized key geometric markers, and the comparing includes first comparing higher priority key geometric markers.

Optionally, the at least one key geometric marker include geometry of a computer generated element.

More optionally, the computer generated element is a simulated shadow cast by the object, dynamically generated to simulate at least one of specific light conditions and specific time.

Optionally, the method further comprises: presenting guidance information to a user of the imaging device, the guidance information includes at least one of location data, direction data, a portion of the reference image, a partial outline of the object, guidance text and audio.

Optionally, the method further comprises, before the extracting: comparing at least one metadata item related to the reference image to metadata related to the current image.

More optionally, the at least one metadata item is acquired by at least one of location sensor, a compass, an accelerometer, a gyroscope, a distance measurement sensor, a depth measurement sensor and a magnetometer.

More optionally, the at least one metadata item is included in the reference image file stored in a memory.

Optionally, the reference image is depicting at least one movable object captured at a specific alignment.

According to some embodiments of the invention there is provided a method of authentication using object imaging, comprising: sequentially repeating the steps of the described method a plurality of times for a plurality of reference images.

Optionally, each of the plurality of reference images is depicting the object as captured from a different viewport.

Optionally, each of the plurality of reference images is depicting a different object.

According to some embodiments of the invention there is provided a computer readable medium comprising computer executable instructions adapted to perform the method.

According to an aspect of some embodiments of the present invention there is provided a system for authentication using object imaging, comprising: a memory for storing at least one key geometric marker related to an object captured from a viewport and depicted in a reference image; an imaging device for capturing a current image of the object; and a processor for: extracting at least one current geometric marker related to the object from the current image; and comparing the at least one current geometric marker to the at least one key geometric marker to verify that the current image is depicting the object from the viewport According to an aspect of some embodiments of the present invention there is provided a computer program product for authentication using object imaging, comprising: a non-transitory computer readable storage medium; a memory for storing at least one key geometric marker related to an object captured from a viewport and depicted in a reference image; first program instructions for receiving a current image of the object, the current image captured by an imaging device; second program instructions for extracting at least one current geometric marker related to the object from the current image; and third program instructions for comparing the at least one current geometric marker to the at least one key geometric marker to verify that the current image is depicting the object from the viewport; wherein the first, second and third program instructions are executed by at least one computerized processor from the non-transitory computer readable storage medium.

According to an aspect of some embodiments of the present invention there is provided a method of identifying an edge of an object in an image, comprising: identifying a key geometric marker related to an object captured from a viewport and depicted in a reference image; receiving a current image of the object, the current image captured by an imaging device; selecting at least one sampling line vertical to the key geometric marker, the at least one sampling line defining an area of interest within the current image; and identifying an edge of the object within the area of interest.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A, 3B and 3C are three frames extracted from a video stream, according to some embodiments of the present invention;

FIGS. 4A and 4B show geometric markers and an image with the geometric markers overlaid on the image, respectively, according to some embodiments of the present invention;

FIGS. 5A and 5B show geometric markers of an object and a shadow and an image with the geometric markers overlaid on the image, respectively, according to some embodiments of the present invention;

FIGS. 8A-H show virtual operation of a physical vault dial using a mobile phone, according to some embodiments of the present invention.

DESCRIPTION OF EMBODIMENTS OF THE INVENTION

Figure 1:
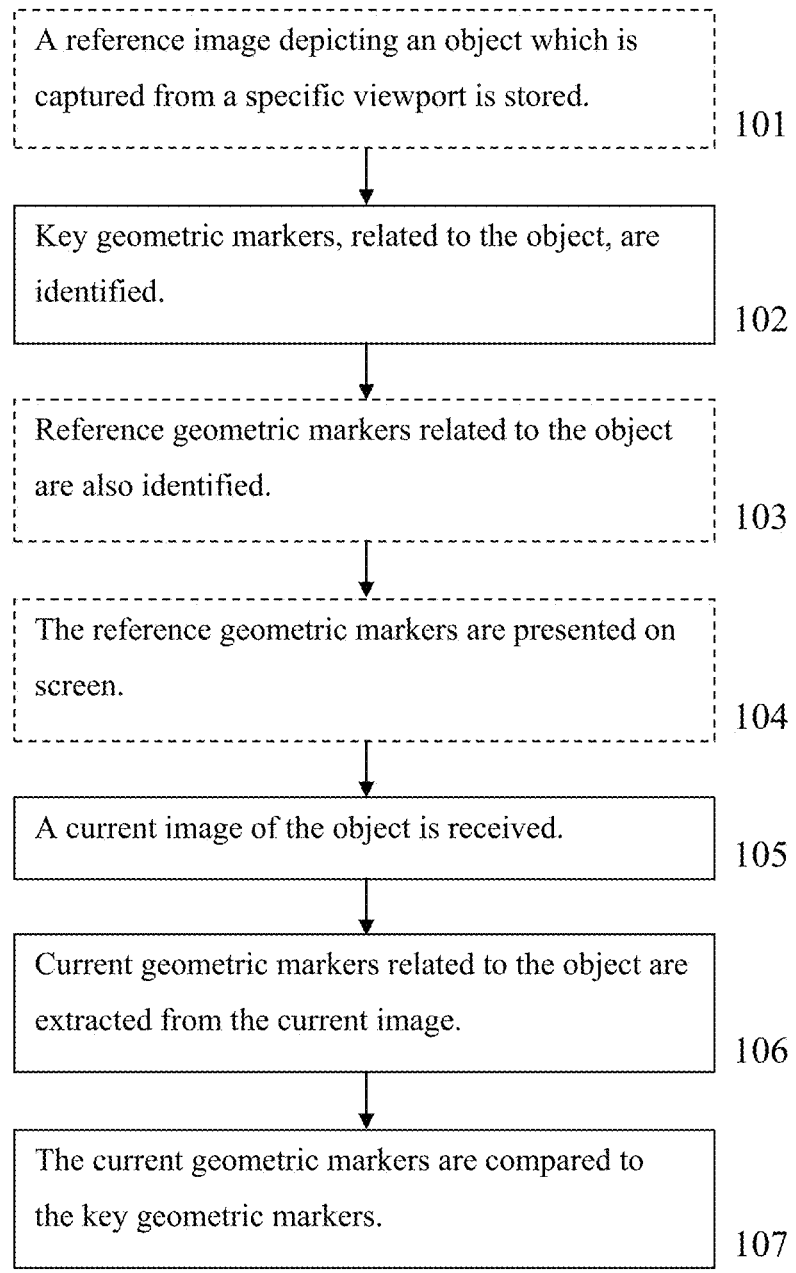
FIG. 1 is a flowchart schematically representing a method of authentication using object imaging, according to some embodiments of the present invention.

The present invention, in some embodiments thereof, relates to authentication by geometric markers related to images and, more specifically, but not exclusively, to authentication of location and other information by comparing geometric markers to verify object imaging from a specific viewport.

According to some embodiments of the present invention, there are provided methods and systems for the authenticating, for example, of a user or a location, by comparing an image of an object, captured by the user using an imaging device such as a camera, to a reference image of the same object. This is done by geometric markers, such as a point, a line or a polygon, related to the object, which are identified in both the reference image (key geometric markers) and current image, and compared. The key geometric markers and the reference image may not be provided to the user, so only by capturing an image of the same object from the same viewpoint (or, more specifically, the same viewport of an imagining device) as it is depicted in the reference image, do the geometric markers match and the user's knowledge of the viewport or imaging device location (relative to depicted object) is verified. Optionally, additional geometric markers (reference geometric markers) and/or other indications may be used as guidance for the user, to properly align the imaging device to capture an image of the object from a correct point of view. These additional geometric markers may be presented to the user, for example on a screen of a mobile device having a camera, for example by overlying or embedding them on a currently captured video sequence on the screen. Optionally, other data related to the images, such as readings from geolocation, such as global positioning system (GPS) or similar, magnetometer, gyroscope, and/or other sensors is compared in addition to the geometric markers.

According to some embodiments of the present invention, key geometric markers related to frames extracted from a pre-recorded images or video sequence, are compared to current geometric markers related to frames from a live video sequence currently acquired by an imaging device. The key geometric markers to be compared with the current geometric markers may originate from images or video sequence which was pre-recorded, for example, around an object, and depicting the object from different views and orientations. It is not practically possible to store pre-recorded images of all positions and angles in the area surrounding the object, due to storage and/or recording limitations. Therefore, when the key geometric markers are provided to a user, the only practical way to create matching current geometric markers is to recreate the original video frame (or image) from which the key geometric markers are extracted, by physically acquiring a similar frame from the same location and orientation relative to the object. This provides verification that the user (or, more accurately, the imaging device), is currently at the specific location.

Methods and systems according to some embodiments of the present invention may also be used for detecting fraudulent positioning data, for example when location sensor data, such as on GPS (or equivalent), is manipulated. Creating fraudulent current geometric markers, from user acquired video or images, that match all possible key geometric markers available in a single location is considerably more complex than manipulating a location sensor on the client device, while comparing such geometric markers generates minimum server side computing load.

Methods and systems according to some embodiments of the present invention provide benefits when compared to typical alphanumeric password challenges, or access control systems operating on GPS (or equivalent) or biometric data. The need to access physical objects dramatically increases the difficulty of illegitimately reporting a location (for example to a server or a software program), impersonating a user or impersonating a valid client device to a server, compared to using GPS (or equivalent) sensor data or alphanumeric passwords. Compared to biometric methods and systems, the methods and systems of the present invention do not require the storage or handling of tightly regulated (biometric) data.

Another benefit may be enhanced positioning data accuracy, compared to other positioning methods. For example, typical GPS positioning accuracy may reach 2-4 meters using quality commercial grade GPS receivers, or about 1 meter using mapping grade GPS receivers. Using the proposed methods and systems positioning accuracy better than 10 millimeters may be offered to the client device in some configurations.

Optionally, multiple frames from the pre-recorded video are used as reference images, so the user is challenged to recapture this specific sequence of frames in order to validate his location, for example when using a mobile device such as a smartphone. The frames may be randomly selected, so unique challenges may be created from the same pre-recorded video sequence.

Optionally, some geometric markers may be extracted from computer generated elements that may be dynamically rendered, and not from the reference image. These geometric markers may be related, for example, to specific time of day and include, for example, a simulated shadow cast by the object. This forces the user to capture the current image at the specific time of day in order to match the geometric markers related to the computer generated shadow, with current geometric markers related to a real shadow cast by the object.

Optionally, imaging of movable objects within a viewport of an imaging device, and/or imaging of an object from different viewport of an imaging device, may be used as a visual 'password' mechanism. The 'password' is verified when the user has knowledge of the correct alignment of the movable objects and/or the correct alignment(s) of the imaging device relative to the object(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart schematically representing a method of authentication using object imaging, according to some embodiments of the present invention. The method includes comparing key geometric markers that are related to a reference image of an object, with current geometric markers that are extracted from a current image, to confirm that the current image is of the same or similar object and taken from the same viewport.

Figure 2A:
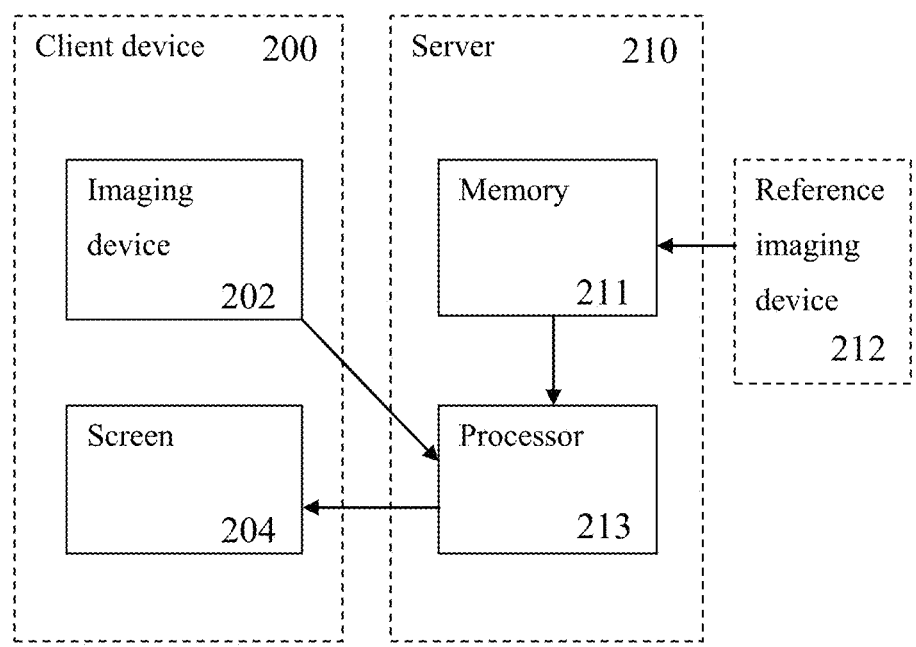
FIGS. 2A and 2B are schematic illustrations of exemplary systems of authentication using object imaging, according to some embodiments of the present invention.
Figure 2B:
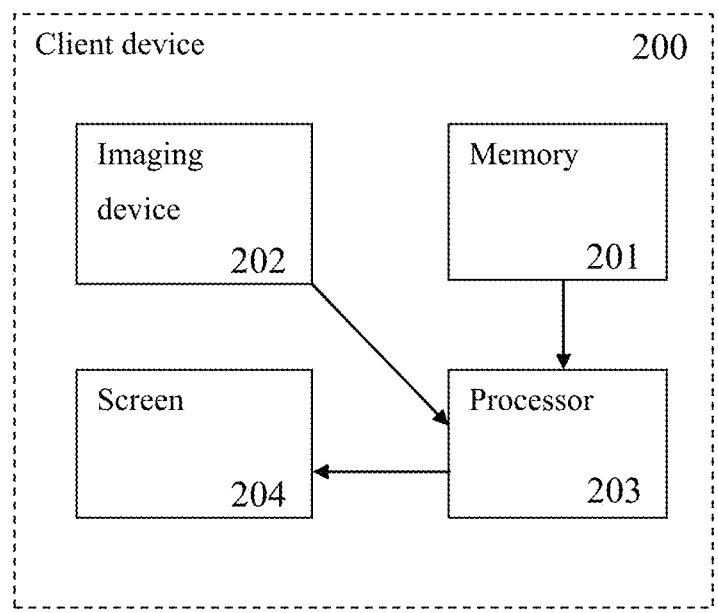

Reference is also made to FIGS. 2A and 2B, which are schematic illustrations of exemplary systems of authentication using object imaging, according to some embodiments of the present invention. FIG. 2A shows an exemplary client-server configuration, where a server 210 includes a memory 211 that may store the reference image and key geometric markers and a processor 213 which extracts geometric markers from images and/or compares geometric markers. A client device 200 includes an imaging device 202 or is coupled to imaging device 202 for capturing the current image. Client device 200 also includes a screen for optionally presenting reference geometric markers. The extraction of current geometric markers may be done by processor 213, from the current image received by server 210 from client device 200. A reference imaging device 212 may capture the reference image. In the configuration shown at FIG. 2B, client device 200 includes a memory 201 and/or is coupled to a memory 201, and includes a processor 203, which are equivalent to memory 211 and processor 213 respectively. In this case, storing of key geometric markers, extraction of current geometric markers from the current image, and/or comparison of the current geometric markers to the key geometric markers is done by client device 200. Memory 201 and memory 211, and also processor 203 and processor 213, may be referred to herein interchangeably to describe functionality, which is intended to be non-limiting. Furthermore, other system configurations are possible for implementing some embodiments of the present invention, and the scope of the description below is intended to include all such configurations.

Client device 200 may be, for example, processing node, computer, laptop, server, mobile device, wearable device such as 'smart-glasses' and/or any processing device. Processor 203 and/or processor 213 may execute software that includes instructions for performing the method. Processor 203 and/or processor 213 may include one or more processors arranged for parallel processing, such as clusters and/or as one or more multi core processor(s) and may also include programmable or specific processing hardware such as field-programmable gate array (FPGA), system on chip (SOC) and/or application-specific integrated circuit (ASIC), neural network hardware, and/or any other processing hardware. Client device 200 may be a mobile device having a screen 204.

Imaging device 202 (and/or imaging device 212) may include one or more light capturing sensors, for example, a single or dual sensor camera of a mobile client device, a webcam, a single-lens reflex camera (SLR), an action camera, a depth sensing camera, an omnidirectional camera, camera included in a wearable device such as 'smart-glasses' and/or any type of digital camera. Imaging device 202 may be included in client device 200, or may be coupled or connected to client device 200. For example, imaging device 202 may be included in 'smart-glasses' worn by the user and coupled to a mobile device held in the user's pocket.

Server 210 may include one or more computing devices such as a mainframe computer, an enterprise server, a workstation, multiple connected computers, one or more virtual machines and/or a personal computer. Server 210 may be connected to imaging device 212, have access to imaging data from such a device, and/or connected to client device 200 comprising imaging device 202, via a network, for example, local area network (LAN), a wireless network such as mobile network, wireless local area network (WLAN) such as Wireless Fidelity (WiFi™), a wireless personal area network (WPAN) such as Bluetooth™ protocol, near-field communication (NFC) and/or any other network.

Memory 201 may include one or more non-transitory persistent storage devices, for example, a hard drive, a Flash array and/or the like. Memory 201 may further comprise one or more network storage devices, for example, a storage server, a network accessible storage (NAS), a network drive, and/or the like. Memory 201 may also include one or more volatile devices, for example, a Random Access Memory (RAM) component and/or the like.

Memory 201 may store one or more software modules, for example, an OS, an application code, a tool, an agent, a service, a script and/or the like, each comprising a plurality of program instructions that may be executed by processor 203 from memory 201.

First, as shown at 101, a reference image is stored on a memory 201. The reference image depicts an object which is captured from a specific viewport.

The viewport is defined as the area/section of the observable world as seen through an optical instrument, such as imaging device 202, which is positioned at a specific location and directed towards a specific orientation. This defines the solid angle through which the capturing sensor of imaging device 202 can accept and register light, which depends on the plane where the capturing sensor resides. The location may be defined by latitude and longitude, as in a global geographic coordinate reference system (such as WGS 84/GPS), horizontally identifying a location. The location may also include altitude, measuring elevation or depth relative to a reference. The location may also be defined by a vector (X,Y,Z) in 3 dimensional space, relative for example to a fixed or movable object. The orientation may be defined by pitch, yaw and roll rotation angles relative to a fixed/directional reference axis e.g. compass/magnetic south-north axis.

The object may be a fixed object, such as a building, a statue, or any other stationary object or a collection of objects of any size. The object may also be movable, for example a portable object, a moving object or an object that may be rearranged or change shape.

The reference image may be captured specifically for use in the system, for example by reference imaging device 212, or may be acquired from an external source such as stock photography repository, social media or any other source. The reference image may be extracted from a single larger image file, or may be a frame selected from a video file randomly and/or according to specific parameters.

Reference is now made to FIGS. 3A, 3B and 3C, which are three frames extracted from a video stream, according to some embodiments of the present invention. The frames are extracted from a video stream of 5 minutes at 60 frames per second, recorded around a historical building in Athens, Greece. Recording a 5 minutes video at 60 frames per second can generate 18,000 frames with unique position and angle views of a given space. Randomly selecting a frame from the video stream prevents the possibility that the user or a program on client device 200 is able to predict which image is used.

Then, as shown at 102, one or more key geometric markers, related to the object, are identified, optionally by a processor 202. When the key geometric markers are inaccessible to the user and optionally to client device 200, they may also be referred as key geometric markers or private key. The key geometric markers may include, for example, point(s), line(s), polyline(s), triangle(s), arc(s), circle(s) and/or any other shape(s) and/or plane(s). The key geometric markers may represent visually identifiable edges of fixed or movable objects or surfaces as seen from the viewport, within the reference image. Different key geometric markers may be identified for the same object. The key geometric markers may be defined by their analytic geometrical representations (vector graphic representations) and not by their pixel locations, to cope with scaling due to image, camera and/or screen resolution differentiations. Optionally, direction may be defined for a geometric marker, for prioritizing processing path within a geometric marker.

The key geometric markers may be automatically generated, for example using image processing techniques and/or algorithms, machine learning neural networks and/or other artificial intelligence techniques. For example, originally, to identify the edges, the image colorspace may be converted to grayscale and Canny edge detector algorithm may be used. For example, to detect straight line vectors, line segment detection (LSD) algorithm (for example as described by Rafael Grompone von Gioi et al., 2012) may be used. For example, to detect circle vectors in the image, circle Hough Transform (CHT) may be used, in which circle candidates are produced by "voting" in the Hough parameter space and then the local maxima in a (called) accumulator matrix is selected.

Optionally, additional pre-processing of the image may be applied to allow better detection of visually identifiable edges within the image. For example, image may be blurred to suppress weak edges, image may be dilated to make edges thicker, Gaussian filtering may be applied to make the edges soft looking, images contrast may be enhanced by using for example histogram equalization techniques to improve performance of circle detection and/or edge pixels in all three color bands of the original color image may be replaced with varying intensity white color to create a grayscale overlay image.

The key geometric markers may be automatically generated, may be manually processed by a human operator, or a combination thereof. For example, key geometric markers are automatically generated, and then some of the automatically generated key geometric markers are manually selected, removed and/or changed, and other key geometric markers are manually created. This may be done, for example, by software that presents the automatically generated key geometric markers to an operator, for example sorted according to size or length, for example overlaid on top of the reference image, and allows the operator to modify how many of the automatically generated key geometric markers are selected to be used. An exemplary user interface used by the operator may include a slide-bar that allows the operator to relatively select what size of geometric markers are used—selecting one end of the slide-bar overlays only one automatically generated geometric marker on the reference image, and selecting the other end of the slide-bar overlays all automatically generated key geometric markers on the reference image.

Reference is now made to FIGS. 4A and 4B, which show geometric markers and an image with the geometric markers overlaid on the image, respectively, according to some embodiments of the present invention. The historical building in the image is identified by lines, rectangles and a triangle, which are related to elements in the structure and architecture of the building.

Optionally, the private key includes multiple key geometric markers which are hierarchically prioritized, so some geometric markers are identified first, as described below. This may be implemented by assigning a priority number to each geometric marker. For example, geometric markers which are related to more noticeable elements in the image are higher in the hierarchy, while geometric markers which are related to finer details in the image are lower in the hierarchy. For another example, larger geometric markers are higher in the hierarchy. The hierarchy may be automatically or manually determined, and may be amended for example to achieve a more balanced distribution of geometric markers along the field of view.

Optionally, the key geometric markers include geometry of one or more computer generated element(s), such as a simulated shadow cast by the object. These computer generated elements may be 3 dimensional elements that are rendered for example by a graphics engine. Therefore, in this case, the key geometric markers include geometric markers that are extracted from at least two sources, the reference image and a computer-created graphic. The computer generated elements may be used to add additional objects, to move, rotate and/or transform non-computer generated objects in the reference image, to reflect different conditions of the object, to add parts to the object and/or to include any other addition or change.

A computer generated element may be dynamically generated based on a specific time and location, to simulate an image of the object under predetermined light conditions and or time of day. This adds a geometric marker related to the original image, which is adjustable without requiring an actual reference image taken under the predetermined light conditions or time. The predetermined time may be a specific time or time period within a 24 h day (as observed at the location), occurring repeatedly (on daily, weekly, monthly or other basis) or just once (tied to a specific date), for example 'from 17:35 to 19:40 local time on 2016.11.30'. The computer generated element may be generated periodically, for example every hour, or may be generated based on a request, triggered for example by a signal from client device 200, at a specific time. The computer generated element may also be generated in advance for a large number of different times.

Reference is now made to FIGS. 5A and 5B, which show geometric markers of an object and a shadow and an image with the geometric markers overlaid on the image, respectively, according to some embodiments of the present invention. The geometric markers are a combination of markers extracted from a reference image together with computer generated markers. The geometric markers of the solar clock (501) come from processing the reference image, while the geometric markers of the casted shadow (502) are dynamically generated (per hour of day).

Optionally, as shown at 103, one or more reference geometric markers related to the object are also identified. The reference geometric markers may include any geometry and may be generated as described above for the key geometric markers. The reference geometric markers may be identified by the same process as the key geometric markers. The reference geometric markers may be differentiated from the key geometric markers, by the software program which is implementing the method, for example by a flag or other parameter.

The reference geometric markers are used as guidance for the user towards the correct positioning of the object relative to the imaging device or the correct positioning of the imaging device relative to the object. The reference geometric markers are accessible to the user visually, or in other ways, so they may also be referred to as a public key, to differentiate from the private key of the key geometric markers which are not accessible to the user visually, or in other ways.

Then, optionally, as shown at 104, the reference geometric markers are presented on screen 204 to indicate the viewport to the user of client device 200 and help him capture a current image of the object from the same viewport or to align movable object(s) within the viewport. Optionally, the reference geometric markers are overlaid on top of a live video stream acquired by imaging device 203.

Optionally, the reference geometric markers are identical or similar to the key geometric markers, for example when strength of authentication is not needed so all available geometric markers may be visible to the user. For example, this may be done in a game setup to verify location, when fraudulent positioning data is unlikely or avoiding or fraudulent positioning data is irrelevant.

Optionally, the user is provided with guidance information, additional to the reference geometric markers, to help him capture a current image of the object from the same viewport. This guidance information may include, for example, location data, direction data, a portion of the reference image, a partial outline of the object overlaid on top of a live video stream acquired by imaging device 203, guidance text and/or any other information. The information may be extracted from the metadata that is attached to the reference image or included in the reference image file stored in memory 201 as file metadata.

Then, as shown at 105, a current image of the object is received. The current image is captured by imaging device 202. The image is transferred from imaging device 202 to processor 203. Optionally, current images are continuously received from a live video sequence as frames, for example captured by a user of client device 200.

Optionally, before geometric markers are extracted from the current image, metadata, such as location, related to the reference image is compared with metadata related to the current image. This may be done, for example, when current images are continuously received from a live video sequence as frames, and extracting geometric markers for each frame is computationally intensive and/or power inefficient. When the metadata related to the reference image is not similar to the metadata related to the current image, within a threshold, geometric markers are not extracted from the current image, and metadata related to the next current image from the video sequence (the next frame) is compared. The comparing of metadata may be done hierarchically for the different types of metadata. For example, one type of metadata is compared first, and only when this type of metadata related to the reference image is similar to the type of metadata related to the current image, then other metadata type(s) are compared.

The metadata may include, for example, geolocation information which may be acquired from location sensors. The location sensors may be using, for example, global navigation satellite system such as GPS, GLONASS, BeiDou or Galileo, cellular network positioning, WiFi positioning and/or any other method. The metadata may also include other sensory information acquired from sensors such as a compass, an accelerometer, a gyroscope, a distance measurement sensor, a depth measurement sensor, a magnetometer and/or any other sensor. For metadata related to the current image, the location sensors and/or other sensors may be coupled to imaging device 202, for example included in client device 200. The metadata may also include any other information, such as text or audio. The metadata related to the reference image may be included in the reference image file stored in memory 201 as file metadata.

Figure 6:
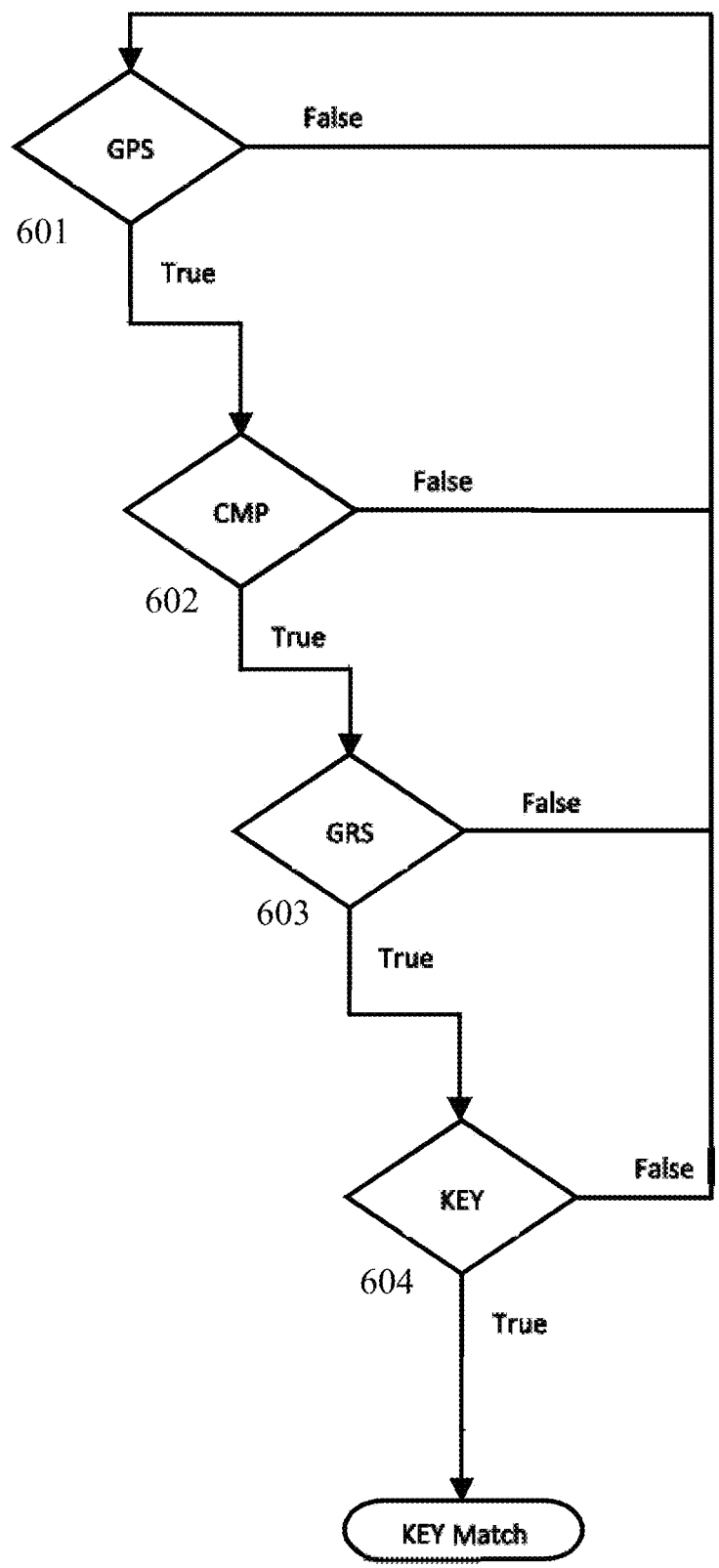
FIG. 6 is a flowchart schematically representing a process of comparing metadata related to a reference image and metadata related to a currently captured image or video sequence, according to some embodiments of the present invention.

Reference is now made to FIG. 6, which is a flowchart schematically representing a process of comparing metadata related to a reference image and metadata related to a currently captured image or video sequence, according to some embodiments of the present invention. The video sequence is recorded by a camera of a client device, which also includes a GPS receiver, a magnetometer and a gyroscope.

First, as shown at 601, current GPS coordinates received from client device 200 are compared to the GPS coordinates which are included in the reference image file, optionally recorded when the reference image is captured. When a match is not found, for example within accuracy of 4 decimal places, the frame is discarded and GPS coordinates for the next frame are compared. When a match is found, the next step is performed.

Then, as shown at 602, current magnetometer (or compass—CMP) data received from client device 200 is compared to direction data which is included in the reference image file, optionally recorded by a magnetometer when the reference image is captured. When a match is not found, for example within alignment of 5 degrees offset, consistently read for more than, for example, 2 seconds, the frame is discarded and GPS coordinates for the next frame are compared. When a match is found, the next step is performed.

Then, as shown at 603, current gyroscope data received from client device 200 is compared to the orientation data which is included in the reference image file, optionally recorded by a gyroscope when the reference image is captured. When a match is not found, for example within alignment of 5 degrees offset, consistently read, for example, for more than 2 seconds, the frame is discarded and GPS coordinates for the next frame are compared. When a match is found, the next step is performed.

Then, as shown at 604, key geometric markers are compared, as described below.

Referencing again to FIG. 1, as shown at 106, one or more current geometric markers related to the object are extracted from the current image. This may be done by processor 203, for example image processing techniques and/or algorithms as described above.

Then, as shown at 107, the current geometric markers are compared to the key geometric markers. When the current geometric markers are similar to the key geometric markers, for example within a given or adaptable threshold, it is verified that the current image is depicting the object from the same viewport as the reference image.

When a current live video is acquired, the correct frame which is depicting the object from the same viewport as the reference image has to be identified. Checking each frame of the video by comparing geometric markers needs to be fast, otherwise spotting the correct frame may become a relatively random process and may make the user feel anxiety and quit. Furthermore, physical vibrations of the imaging device, such as minor hand or body movement, when combined with low acquisition rates or processing speeds may also render the comparison process unreliable (random). That is, properly aligned image captures (that would otherwise match to the reference image) fail to enter the match validation process before the next acquired frame comes in, while prolonged buffering is not possible due to volume limitations.

Optionally, when the private key includes multiple key geometric markers which are hierarchically prioritized, the highest priority key geometric markers are first used for matching with current geometric markers. When the highest priority geometric markers do not match, lower priority geometric markers are not compared. Otherwise, lower priority geometric markers are compared, according to priority. This may be done, for example in the case of live video sequence acquisition, to reduce computational load and/or power, as described above for comparing metadata. Optionally, the number of geometric markers in each priority may be adjusted, for example according to processing capabilities of processor 203 and/or power capabilities of client device 200. Optionally, the comparison of geometric markers in multiple frames is done in parallel or by using buffers.

Figure 7A:
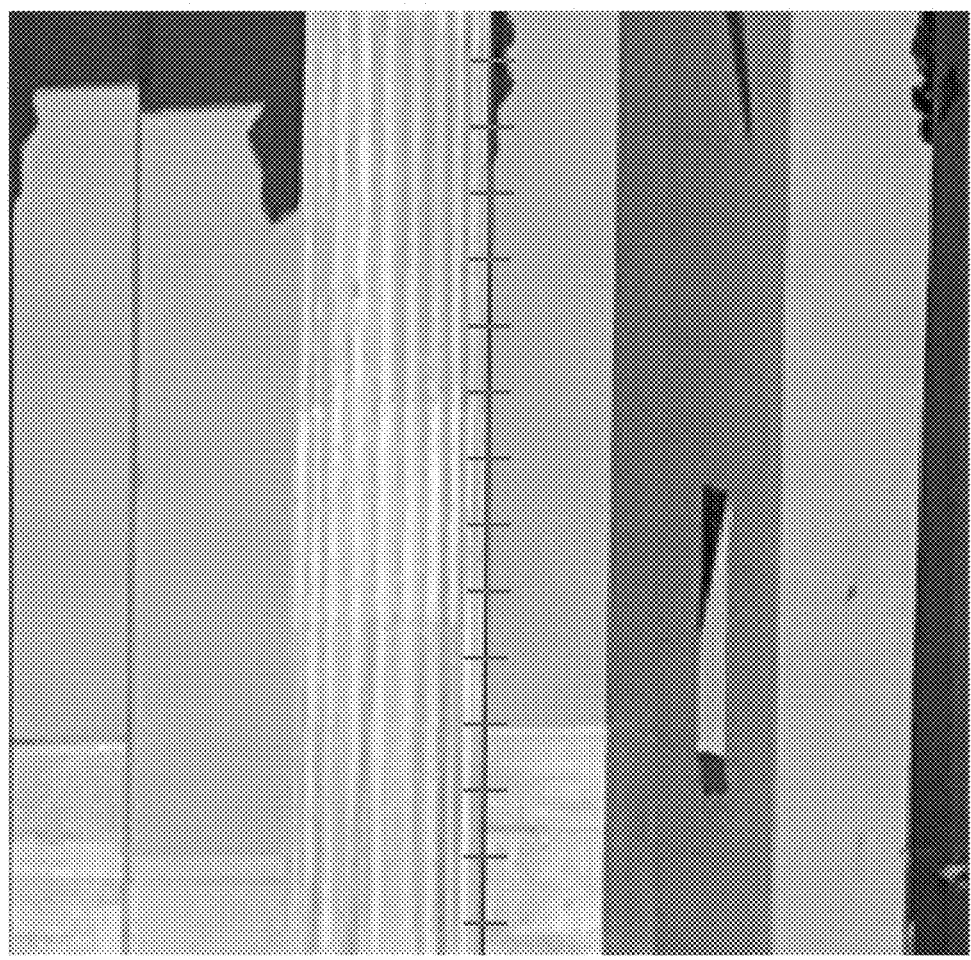
FIGS. 7A and 7B are an exemplary image having an area of interest for edge detection and an enlargement thereof, according to some embodiments of the present invention.
Figure 7B:
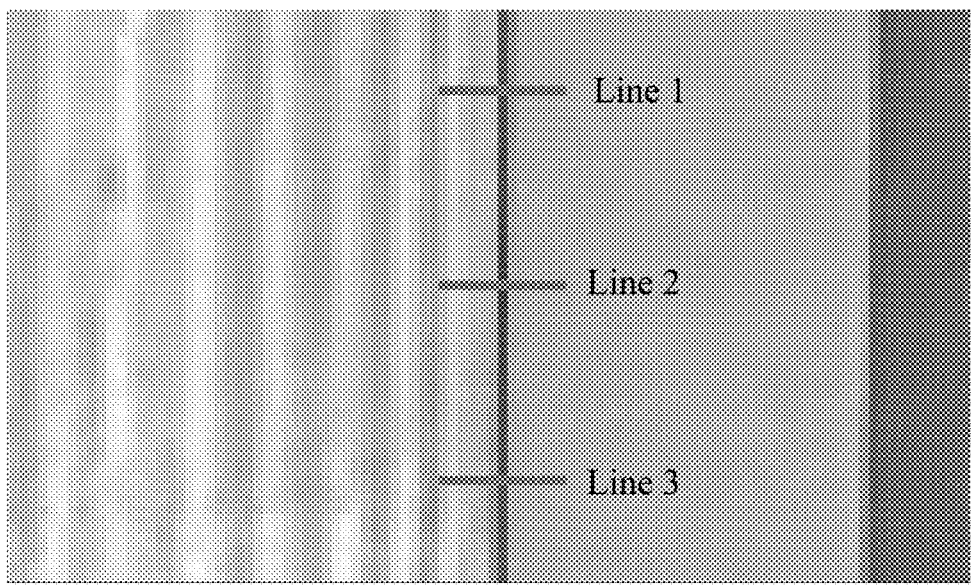
Figure 7C:
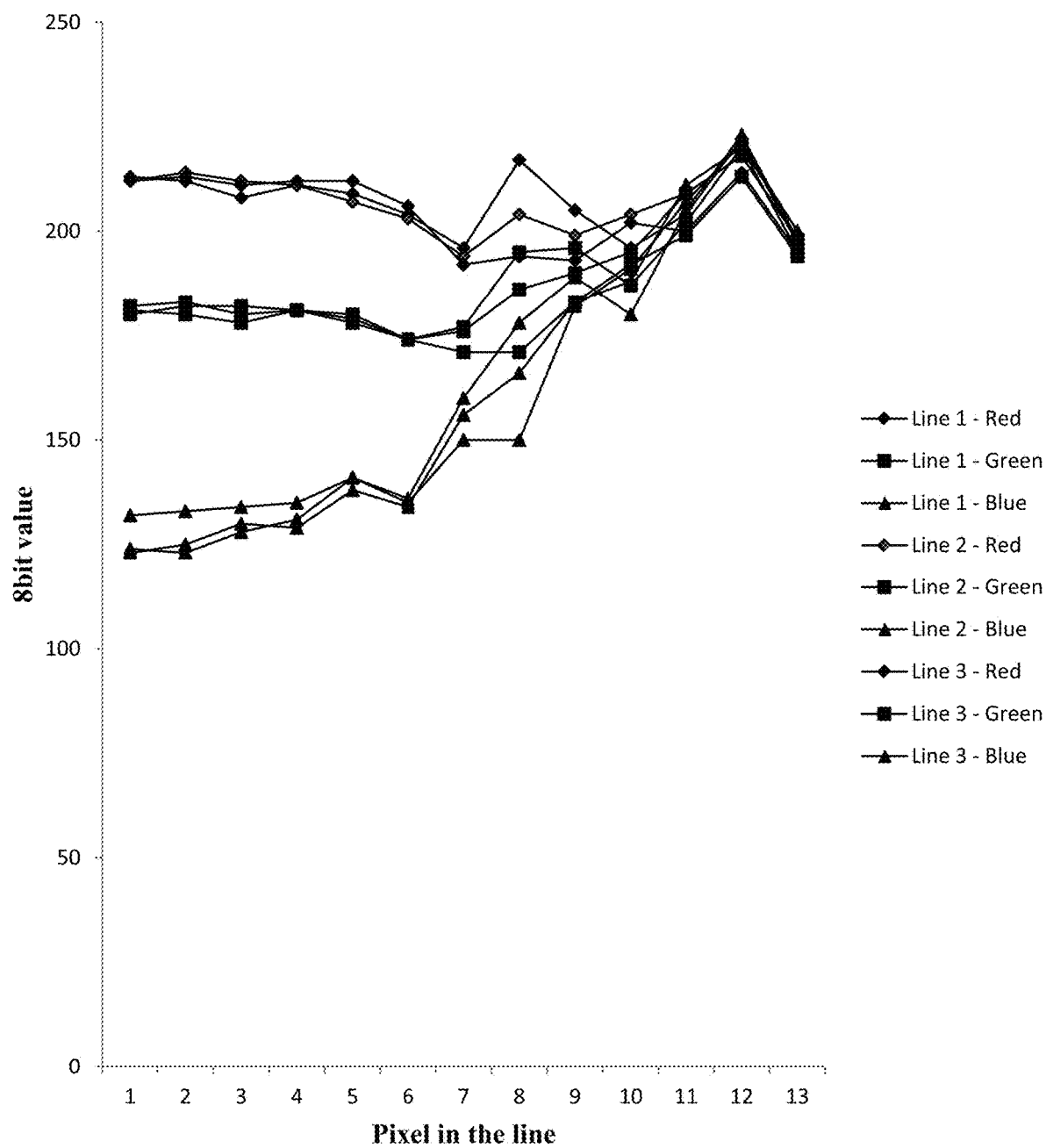
FIG. 7C is a graph showing values of each color of the sampled lines of FIG. 7B, according to some embodiments of the present invention.

Optionally, an area of interest is defined around geometric markers within the image to apply fast sampling strategies. The area of interest may be defined by line(s) which are vertical to the geometric marker. The area of interest may be defined around a key geometric marker and be used to identify an edge of an object defining a matching current geometric marker. Reference is now made to FIGS. 7A and 7B, which are an exemplary image having an area of interest for edge detection and an enlargement thereof, according to some embodiments of the present invention. The exemplary image may be a frame acquired in real-time, for example by a smartphone camera which delivers data in the range of 750 MB per second (resolution of 3840×2160 pixels, at 30 frames per second, at 3 bytes per pixel). Fast analytical geometry methods may be used to identify sampling points, shown as horizontal short lines (sampling lines), which define an area in which it is highly probable (expected) to detect an edge limit (along a geometric marker shown as a long vertical line). The distances between sampling lines may be fixed, or adjustable for example per curvature variation rate, for each geometric marker. FIG. 7B shows 39 sampled pixels (3 sample lines of 13 pixels each), over an area of 780 pixels (60×13 pixels), which represents an under sampling of 20:1. For example, by using this sampling method on 255 consecutive frames (0 frame drops) on a mid-range smartphone, checking 10 geometric markers (per frame) with 16 sampling lines on each geometric marker, where each sampling line is 20 pixels wide and distanced to the next by 10 pixels, an average of 121 microseconds processing time per frame may be achieved, while frame acquisition rate is 16 milliseconds (137 times faster). Reference is also made to FIG. 7C, which is a graph showing values of each color of the sampled lines of FIG. 7B, according to some embodiments of the present invention. The 8-bit values of each of the red, green and blue (RGB)

colors for each of the sampled pixels in the 3 sampling lines are shown in the graph. A change in color is seen around pixel 8, which may be identified as the edge in the image. The most drastic change is seen in the blue color, which therefore contains more information for edge identification. Geometric markers may be utilized to define regions of interest (around them) within an image or frame. This shortens the processing time (per frame and/or region) of live acquired video which may free up time for making higher level decisions for this image-acquisition and processing environment, enabling adaptive and power efficient object matching techniques do be developed (such as choosing color channels containing more information for a specific processing task per specific image, such as edge detection).

Optionally, image sequences may be processed to remove noise such as other objects moving in front of the object, blocking areas related to geometric markers. For example, an algorithm may predict what is behind passing people, vehicles, banners and/or other objects which are moving in a way that is interrupting the view of the object.

Optionally, when it is verified that the current image is depicting the object from the same viewport as the reference image, authentication is established. Optionally, when the authentication is established by server 210, an authentication certificate is generated by server 210 and sent to client device 200. Optionally, when authentication is established by client device 200, the current image may be sent to the server 210 to trigger the generation of a server-side authentication certificate. Optionally, when the authentication is established, server 210 provides access for client device 200 to information, to additional functionalities and/or to a system. Optionally, when the authentication is established, access is granted to the user for example to information, a program or a feature in a program.

Optionally, steps 101-107 are sequentially repeated multiple times for multiple reference images. Optionally, verification of all images is required to establish authentication. Optionally, each reference image is depicting the object as captured from a different viewport, or depicting different objects.

Optionally, each reference image is a frame extracted from a video sequence. Optionally, the reference images are randomly selected from the video sequence, so predicting the specific reference images that are required to establish authentication in any given space is impossible, since it is not practically possible for the user to store all images which are possible to acquire in any given space. This provides additional security that forces acquisition of matching current images. Reference is now made, once again, to FIGS. 3A, 3B and 3C. As indicated above, the video sequence may include 18,000 frames with unique position and angle views of a given space. Combining two such frames may generate 324 million unique frame combinations (out of the same original 5 minutes video sequence), while using three such frames generates 5.8 trillion unique combinations. This particular combination, shown in FIGS. 3A, 3B and 3C, is an exemplary one of the possible 5.8 trillion unique 3-frame combinations.

A video recording may be done when the imaging device is moved across a linear path within the three-dimensional space. This makes each video recording path a unique selection of traveling from point A to point B, out of infinite optional paths. It is then required to follow a similar path, relative to the object or multiple objects, so as to capture images from a predetermined series of locations and orientations.

In an exemplary scenario of using a method and system according to some embodiments of the present invention, client device 200 communicates its current location and other sensory data to a server, via a validation software, and receives as a response a public key including geometric markers related to the communicated information. The geometric markers and related text information is presented to the user of client device 200 to assist him in aligning the viewport of the camera of client device 200 towards fixed objects and/or aligning movable objects within a given viewport of the camera. The processor of client device 200 checks visually identifiable edges of fixed or movable objects or surfaces within the camera's viewport matching the edges indicated by the geometric markers of the private key communicated by server 210 to client device 200. In case of a match, validation data are communicated back to server 210 and server 210 responds with a server side validation certificate or a new private key match requirement to further secure the access accreditation process.

According to some embodiments of the present invention, the method is used to verify knowledge of a sequence or arrangement of one or more objects, which serves as a password provided by a user.

Reference is now made to FIGS. 8A-H, which show virtual operation of a physical vault dial using a mobile phone, according to some embodiments of the present invention.

FIG. 8A shows reference geometric markers (public key) as presented on the screen of the mobile phone. The geometric markers match the outline of the vault dial to help the user in adjusting the camera of the mobile phone to the correct point in front of the vault dial, and also include a guidance mark.

FIGS. 8B, 8C and 8D show the private key, not presented to the user, which are key geometric markers of specific numbers on the vault dial ('12', '88' and '32' respectively), which are related to reference images of the vault dial from different orientations. The user has to know the sequence of numbers, and turn the mobile phone in the correct orientations, in the correct order, so each time the correct number is aligned to the guidance mark. Optionally, location information is also included in the private key, so the vault dial may only be operated from a specific location or locations, for example the user's home or office.

FIG. 8E shows the reference geometric markers resented on the screen of the mobile phone and overlaid on a current live video sequence of the vault dial, oriented in a starting position. FIGS. 8F, 8G and 8H show the mobile phone, as rotated correctly so current geometric markers extracted from frames of the current live video sequence, of the numbers on the vault dial ('12', '88' and '32' respectively) are matching the key geometric markers. When the last number is correctly oriented, the sequence is entered and access to the vault may be given.

Reference is now made to FIGS. 9A-F, which show arrangement of multiple movable objects within the viewport of a camera, used as password mechanism, according to some embodiments of the present invention.

Figure 9A:
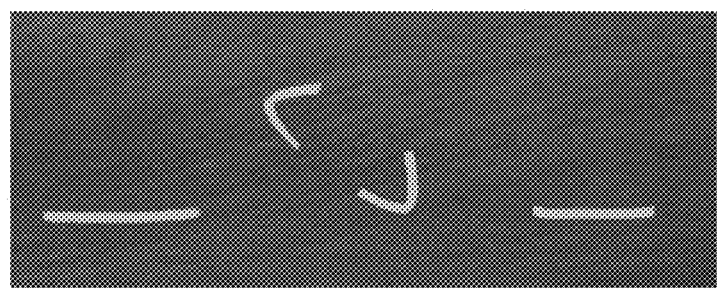
FIGS. 9A-F show arrangement of multiple movable objects within the viewport of a camera, used as password mechanism, according to some embodiments of the present invention.
Figure 9B:
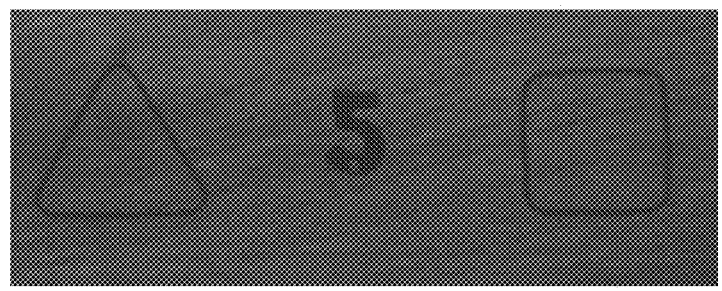

FIG. 9A shows reference geometric markers (public key) which are presented to the user on a screen, on top of camera acquired video stream, for alignment purposes. FIG. 9B shows key geometric markers (private key), not presented to the user, and are only available to the validation software.

Figure 9C:
Figure 9D:
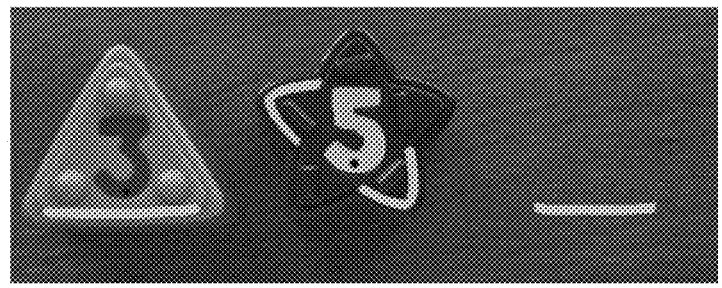
Figure 9E:
Figure 9F:
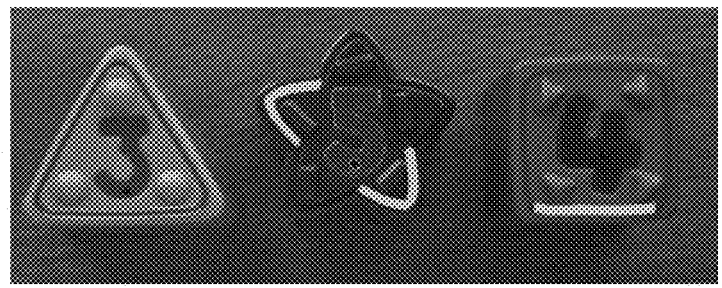

In FIGS. 9C, 9D and 9E, the user adds physical objects to the camera field of view, matching the alignment guides of the public key. Any of the objects may be rotated around their axes, while objects 3 and 4 may also be switched in places between them, still creating an arrangement that fits the profile set by the public key. Unless the user has knowledge of the correct arrangement of the objects, the key geometric markers compared to the geometric markers extracted from the current live-acquired video stream do not match, and therefore authentication fails. FIG. 9F shows all geometric markers matching a correct arrangement of the movable objects according to both reference and key geometric markers.

By properly selecting the physical objects visible in a pre-recorded video sequence or image and generating geometric markers out of selected frames of such video sequence and/or by adding dynamic, software generated geometric markers, it is possible to create 'single-use password' challenges. For example, in a server-client configuration, server 210 may extract key geometric markers from different frames and frame sequences, present different reference geometric markers per password challenge (even ones corresponding to the same physical object), generate fake alignment or reference geometric markers (not corresponding to key geometric markers) to add complexity (for example generating reference geometric markers that are suggesting a 4-number password, while the correct password only has 3 numbers), and/or use different arrangements of objects (for example by moving or rotating objects). Such operations practically force the user of client device 200 to have physical access and visibility to the depicted physical objects. By making up a 'key' each time, server 210 is challenging client device 200 for a 'password'.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant authentication processes will be developed and the scope of the term authentication is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of authentication using object imaging, comprising:
   identifying at least one key geometric marker related to an object captured from a viewport and depicted in a reference image, said at least one key geometric marker is indicative of said viewport;
   receiving a current image of said object, said current image captured by an imaging device;
   extracting at least one current geometric marker related to said object from said current image; and comparing said at least one current geometric marker to said at least one key geometric marker to verify that said current image is depicting said object from said viewport for authenticating current position of said imaging device relative to said object.

2. The method of claim 1, further comprising:
identifying at least one reference geometric marker related to said object in said reference image;
presenting said at least one reference geometric marker to a user of said imaging device to indicate said viewport to said user.

3. The method of claim 1, further comprising, first:
acquiring said reference image by a reference imaging device; and
extracting said at least one key geometric marker from said reference image.

4. The method of claim 1, wherein said at least one reference geometric marker is overlaid on top of a live video stream acquired by said imaging device.

5. The method of claim 1, wherein said at least one key geometric marker includes at least one of a point, a line, a polyline, an arc, a shape and a plane.

6. The method of claim 1, wherein said at least one key geometric marker represent at least one edge of said object, said at least one edge is visually identifiable in said reference image.

7. The method of claim 1, wherein said reference image is a frame randomly selected from a video sequence.

8. The method of claim 1, wherein said reference image is from a larger image file.

9. The method of claim 1, wherein said at least one key geometric marker include a plurality of hierarchically prioritized key geometric markers, and said comparing includes first comparing higher priority key geometric markers.

10. The method of claim 1, wherein said at least one key geometric marker include geometry of a computer generated element.

11. The method of claim 10, wherein said computer generated element is a simulated shadow cast by the object, dynamically generated to simulate at least one of specific light conditions and specific time.

12. The method of claim 1, further comprising:
presenting guidance information to a user of said imaging device, said guidance information includes at least one of location data, direction data, a portion of said reference image, a partial outline of said object, guidance text and audio.

13. The method of claim 1, further comprising, before said extracting:
comparing at least one metadata item related to said reference image to metadata related to said current image.

14. The method of claim 13, wherein said at least one metadata item is acquired by at least one of location sensor, a compass, an accelerometer, a gyroscope, a distance measurement sensor, a depth measurement sensor and a magnetometer.

15. The method of claim 13, wherein said at least one metadata item is included in the reference image file stored in a memory.

16. The method of claim 1, wherein said reference image is depicting at least one movable object captured at a specific alignment.

17. A method of authentication using object imaging, comprising:

sequentially repeating the steps of claim 1 a plurality of times for a plurality of reference images.

18. The method of claim 17, wherein each of said plurality of reference images is depicting said object as captured from a different viewport.

19. The method of claim 17, wherein each of said plurality of reference images is depicting a different object.

20. A computer readable medium comprising computer executable instructions adapted to perform the method of claim 1.

21. The method of claim 1, wherein said current image is captured by a user from a current viewport, and said comparing includes comparing said current viewport to said viewport.

22. A computer program product for authentication using object imaging, comprising:
a non-transitory computer readable storage medium;
a memory for storing at least one key geometric marker related to an object captured from a viewport and depicted in a reference image, said at least one key geometric marker is indicative of said viewport;
first program instructions for receiving a current image of said object, said current image captured by an imaging device;
second program instructions for extracting at least one current geometric marker related to said object from said current image; and
third program instructions for comparing said at least one current geometric marker to said at least one key geometric marker to verify that said current image is depicting said object from said viewport for authenticating current position of said imaging device relative to said object;
wherein said first, second and third program instructions are executed by at least one computerized processor from said non-transitory computer readable storage medium.

23. A method of identifying an edge of an object in an image, comprising:
identifying a key geometric marker related to an object captured from a viewport and depicted in a reference image, said at least one key geometric marker is indicative of said viewport;
receiving a current image of said object, said current image captured by an imaging device;
selecting at least one sampling line vertical to said key geometric marker, said at least one sampling line defining an area of interest within said current image; and
identifying an edge of said object within said area of interest.

24. A system for authentication using object imaging, comprising:
a memory for storing at least one key geometric marker related to an object captured from a viewport and depicted in a reference image, said at least one key geometric marker is indicative of said viewport;
an imaging device for capturing a current image of said object; and
a processor for:
extracting at least one current geometric marker related to said object from said current image; and
comparing said at least one current geometric marker to said at least one key geometric marker to verify that said current image is depicting said object from said viewport for authenticating current position of said imaging device relative to said object.

\* \* \* \* \*